United States Patent [19]

Lane

[11] Patent Number: 5,598,222
[45] Date of Patent: Jan. 28, 1997

[54] METHOD AND APPARATUS FOR DECODING MULTIPLE VIDEO BITSTREAMS USING A COMMON MEMORY

[75] Inventor: Frank A. Lane, Medford, N.J.

[73] Assignee: Hatachi American, Ltd., Tarrytown, N.Y.

[21] Appl. No.: 424,686

[22] Filed: Apr. 18, 1995

[51] Int. Cl.⁶ .............................. H04N 5/262; H04N 5/45
[52] U.S. Cl. .......................... 348/568; 348/565; 348/567; 348/714; 348/584
[58] Field of Search .................................... 348/385, 388, 348/387, 568, 567, 565, 714, 715, 598, 584, 716; H04N 5/262, 5/45

[56] References Cited

U.S. PATENT DOCUMENTS

| | | | |
|---|---|---|---|
| 4,238,773 | 12/1980 | Tsuboka | 348/568 X |
| 5,091,785 | 2/1992 | Canfield et al. | 348/567 |
| 5,237,460 | 8/1993 | Miller et al. | 360/8 |
| 5,313,303 | 5/1994 | Ersoz | 348/439 |
| 5,367,318 | 11/1994 | Beaudin et al. | 345/201 |
| 5,386,241 | 1/1995 | Park . | |
| 5,398,072 | 3/1995 | Auld . | |
| 5,408,270 | 4/1995 | Lim . | |
| 5,422,677 | 6/1995 | Do | 348/565 X |
| 5,506,636 | 4/1996 | Patel et al. | 348/725 |

OTHER PUBLICATIONS

A. Hoffman, Future Prospects of The Cable TV Network, (1993) pp. 17–20.

*Primary Examiner*—John K. Peng
*Assistant Examiner*—Nathan J. Flynn
*Attorney, Agent, or Firm*—Michaelson & Wallace; Michael P. Straub; Peter L. Michaelson

[57] ABSTRACT

Implementation efficient video decoder for decoding multiple bitstreams to provide picture-in-picture capability in a digital video display device is disclosed. The video decoder includes a full resolution video decoder and a reduced resolution video decoder. The reduced resolution decoder decodes and downsamples video images using the same video memory device used by the full resolution decoder. By using a sufficient amount of downsampling, the amount of memory required to implement the video frame memory and decoder buffer required by the reduced resolution video decoder is reduced to a point where the frame memory and decoder buffer can be implemented using excess memory which is left over from the implementation of the full resolution decoder frame memory and decoder buffer. Accordingly, the present invention avoids or reduces the need to provide additional memory for frame storage when implementing picture-in-picture capability in a digital video display device. In one embodiment the full and reduced resolution decoders are implemented as a single integrated circuit and share a common bus used to access a single shared video memory module.

20 Claims, 2 Drawing Sheets

METHOD AND APPARATUS FOR DECODING MULTIPLE VIDEO BITSTREAMS USING A COMMON MEMORY

FIELD OF THE INVENTION

The present invention is directed to video decoders and, more particularly, to methods and apparatus for implementing video decoders that are capable of decoding two or more video bitstreams to provide, e.g., picture-in-picture capability.

BACKGROUND OF THE INVENTION

The use of digital, as opposed to analog signals, for television broadcasts and the transmission of other types of video and audio signals has been proposed as a way of allowing improved picture quality and more efficient use of spectral bandwidth over that currently possible using analog NTSC television signals.

The International Standards Organization has set a standard for video data compression for generating a compressed digital data stream that is expected to be used for digital television. This standard is referred to as the ISO MPEG (International Standards Organization—Moving Picture Experts Group) ("MPEG") standard. In accordance with the MPEG standard, video data is encoded using discrete cosine transform encoding and is arranged into variable length encoded data packets for transmission.

Generally, digital television signals can be either standard definition signals having a resolution approximately that of current NTSC television, or high definition television signals which have a resolution that is greater that of current NTSC television signals.

One version of the MPEG standard, MPEG-2, is described in the International Standards Organization—Moving Picture Experts Group, Drafts of Recommendation H.262, ISO/IEC 13818-1 and 13818-2 titled "Information Technology—Generic Coding Of Moving Pictures and Associated Audio" (hereinafter "the November 1993 ISO-MPEG Committee draft") hereby expressly incorporated by reference. Any references made in this patent application to MPEG video data is to be understood to refer to video data that complies with MPEG-2 standards as defined in the November 1993 ISO-MPEG Committee drafts unless otherwise indicated.

Picture-in-picture capability has become a widely accepted and often desired feature of modern analog televisions. To meet anticipated demand for picture-in-picture capability in digital televisions, it will be necessary for a digital television, e.g., an MPEG-2 compatible television, to decode video data representing two pictures. The two pictures can then be displayed as a picture within a picture to achieve the desired picture-in-picture effect.

In known analog picture-in-picture systems, during picture-in-picture operation, and full resolution decoder is normally used to decode the TV signal used to produce a main picture and a second full resolution decoder is used to decode the television signal which is used to provide the second picture displayed within a small area of the main picture.

The cost of providing two full resolution video decoders and, in particular, the memory required to implement two such decoders, in the case of digital video signals is likely to be significant.

In order to achieve customer acceptance in home video systems, it is desirable that the cost associated with adding picture-in-picture capability to a digital television set be minimized.

Accordingly, there is a need for a method and apparatus that can be used to provide picture-in-picture capability in, e.g., video decoding and display devices such as digital television sets, at a minimal cost.

SUMMARY OF THE PRESENT INVENTION

The present invention is directed to video decoders and, more particularly, to video decoders for, e.g., decoding two or more video bitstreams to provide, e.g., picture-in-picture capability.

The method and apparatus of the present invention may be used to reduce the cost of implementing picture-in-picture capability in a digital television set by using a single memory storage device to serve as a video decoder buffer and frame memory for two video decoders, e.g., a primary video decoder and a secondary video decoder. The methods and apparatus of the present invention are particularly well suited for implementing picture-in-picture systems such as the one described in pending U.S. patent application Ser. No. 08/339,436, titled METHODS AND APPARATUS FOR IMPLEMENTING A LOW COST JOINT HD/SD TELEVISION DECODER which is hereby expressly incorporated by reference. In such systems, full resolution video images are used for the primary picture while reduced resolution images are used for the secondary picture which serves to provide picture-in-picture capability. Because of the relatively low resolution of the secondary pictures the data representing the secondary pictures can be stored using a fraction of the memory required to store the primary full resolution pictures which may be, e.g., high definition or standard definition television pictures.

Because current memory modules are available in units of, e.g., 1, 4, or 16 megabits, there is often some portion of the memory modules used to implement the video decoder buffer/frame memory (e.g., buffer) of a full resolution video decoder that represents excess capacity.

The methods and apparatus of the present invention use the excess memory capacity of the memory module used as the video decoder buffer/frame memory of a primary, e.g., full resolution, video decoder as the video decoder buffer/frame memory of a secondary video decoder which generates reduced resolution images suitable for providing picture-in-picture capability.

Thus, by using the otherwise excess memory capacity of a full resolution video decoder buffer/frame memory as the video decoder/frame buffer of a reduced resolution video decoder, it is possible to implement picture-in-picture capability while reducing or eliminating the cost normally associated with providing a video decoder buffer/frame memory module for the second decoder of a picture-in-picture system.

DETAILED DESCRIPTION

The present invention is directed to video decoders and, more particularly to video decoders for, e.g., decoding two or more video bitstreams to provide, e.g., picture-in-picture capability.

Figure 1:
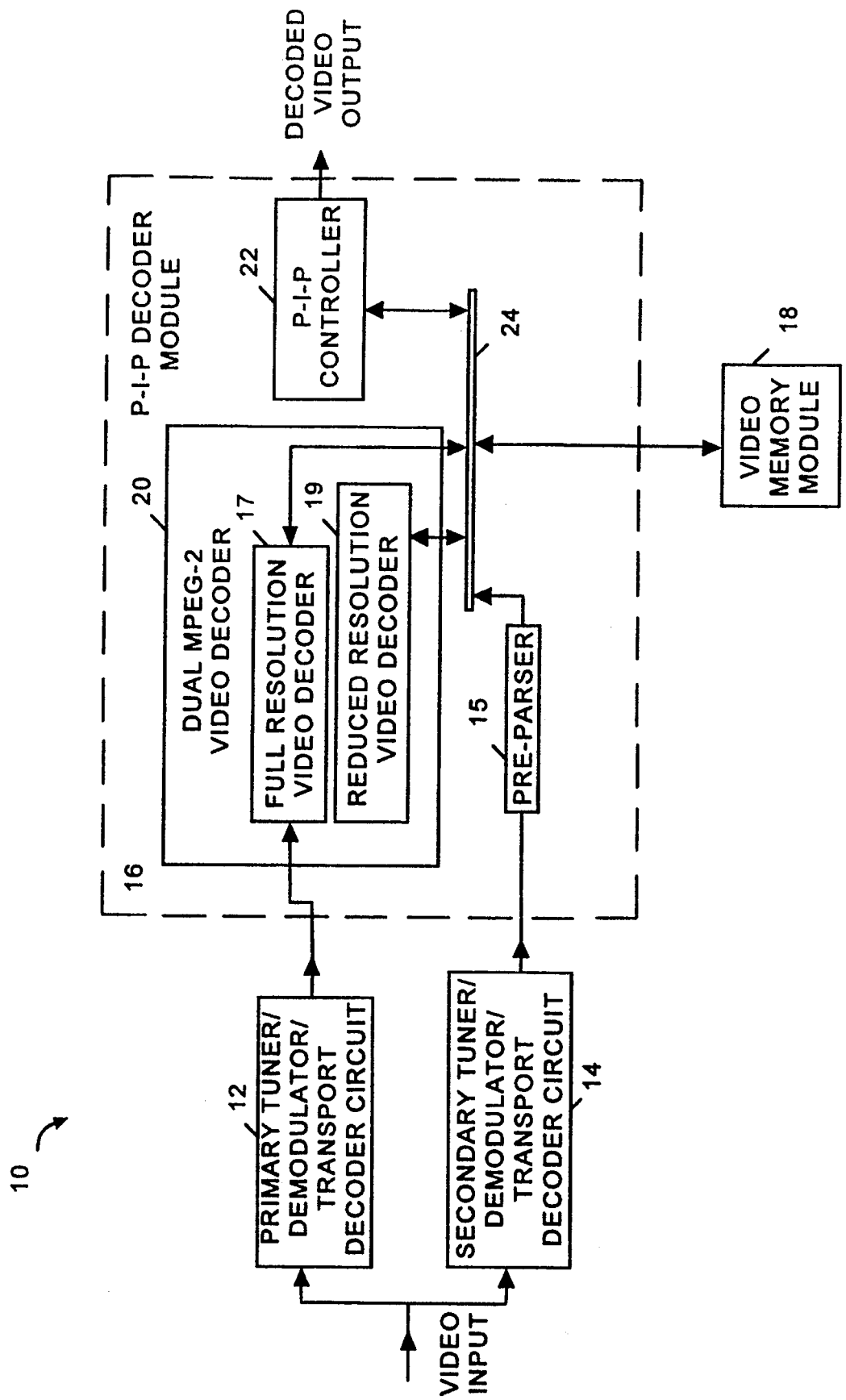
FIG. 1 illustrates a video decoder implemented in accordance with one exemplary embodiment of the present invention.

Referring now to FIG. 1, there is illustrated a dual-stream video decoder circuit implemented in accordance with the present invention generally indicated by the reference number 10. The dual-stream video decoder circuit 10 comprises a primary tuner/demodulator/transport decoder ("T/D/TD") circuit 12, a secondary T/D/TD circuit 14, a video memory module 18 and a P-I-P decoder module 16.

The primary and secondary T/D/TD circuits 12, 14 which may be the same as, or similar to each other, each receive as their inputs an encoded digital video signal, e.g., an MPEG-2 compliant video bitstream including transport data packets.

The primary T/D/TD circuit 12 is responsible for providing channel selectivity with regard to the primary, e.g., full resolution picture channel selected by, e.g., a user, for display. It is also responsible for performing demodulation and decoding on the received transport data packets at the transport level to produce a depacketized coded MPEG data stream which is supplied to a first input of the P-I-P decoder module 16.

The secondary T/D/TD circuit 14 is responsible for providing channel selectivity with regard to the secondary picture channel selected by, e.g., a user, for display as a picture within the primary picture. It is also responsible for performing demodulation and decoding on the received transport data packets at the transport level to produce a depacketized coded MPEG data stream which is supplied to a second input of the P-I-P decoder module 16.

The P-I-P decoder module 16 which may be implemented as, e.g., a single integrated circuit, comprises a dual MPEG-2 video decoder circuit 20, a pre-parser 15, a P-I-P controller 22, and a bus for coupling the elements of the P-I-P decoder module 16 to each other and to the memory module 18. The dual MPEG-2 video decoder circuit 20 comprises a full resolution video decoder circuit 17 for decoding the primary coded video signal output by the primary T/D/TD circuit 12 and a secondary, e.g., reduced resolution video decoder circuit 19 for decoding a secondary coded video signal generated by the pre-parser 15 from the output of secondary T/D/TD circuit 14.

The primary and secondary decoder circuits of the dual MPEG-2 video decoder circuit 20, as well as the pre-parser 15, may be implemented in accordance with the teachings of U.S. patent application Ser. No. 08/339,436.

The video memory module 18 serves as the coded data buffer and frame memory for the primary and secondary decoder circuits 17, 19 of the dual MPEG-2 video decoder circuit 20. The dual MPEG-2 video decoder 20 generates a primary decoded video data stream of full resolution pictures and a secondary decoded video data stream of low resolution pictures which are supplied to the P-I-P controller 22 via the bus 24.

During picture-in-picture modes of operation, the P-I-P controller 22 combines the pictures from the primary and secondary decoded video data stream to generate the decoded video data stream output by the P-I-P decoder module 16.

During standard modes of video operation where only a single full resolution image is to be displayed at any given time, the P-I-P controller 22 operates to output the primary decoded video data stream as the output of the P-I-P decoder module 16.

Figure 2:
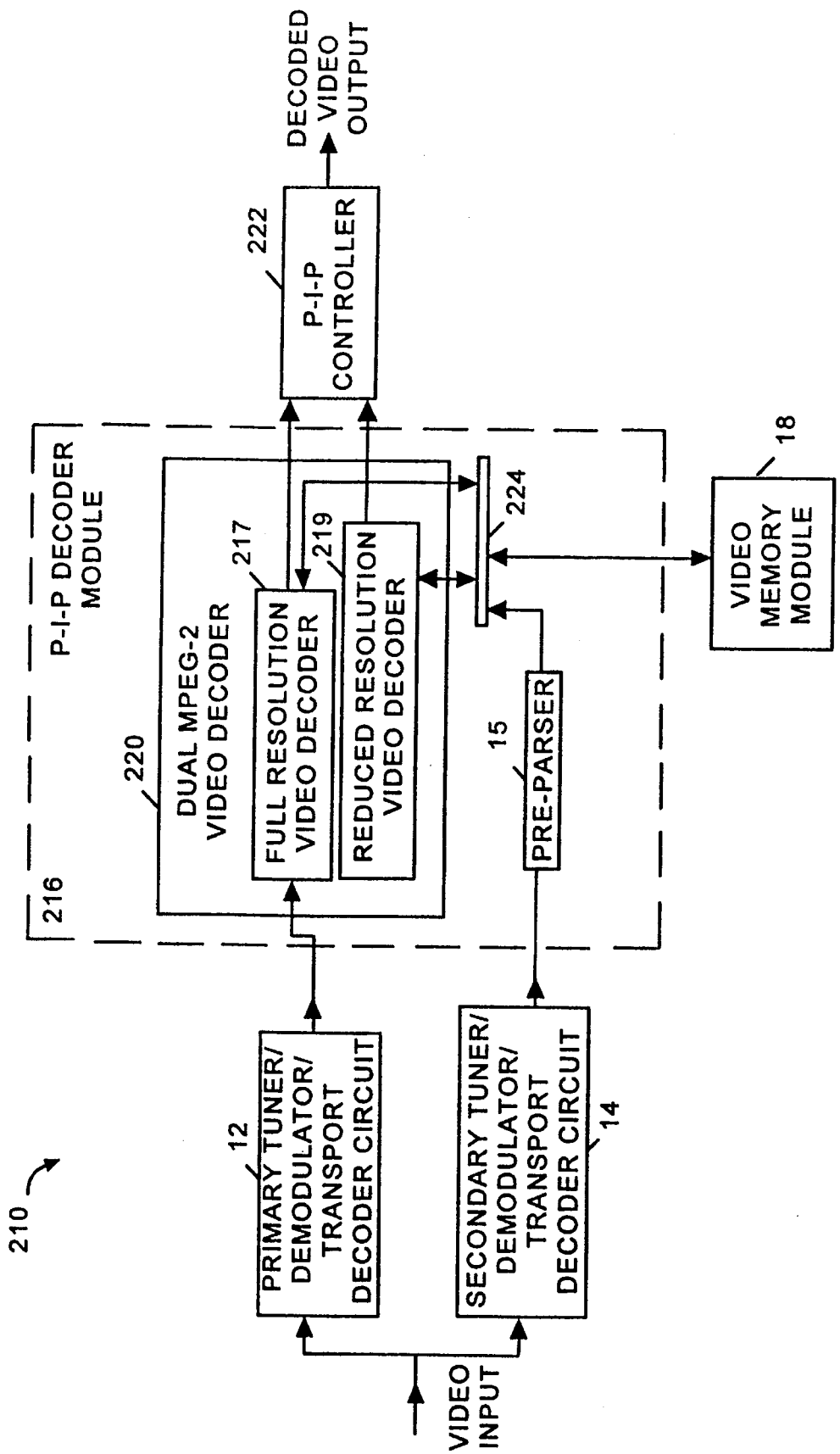
FIG. 2 illustrates a video decoder implemented in accordance with a second exemplary embodiment of the present invention.

Referring now to FIG. 2, a second embodiment of the dual-stream video decoder circuit of the present invention is illustrated.

Elements of the dual stream video decoder circuit 210 of FIG. 2 that are the same as, or similar to, the elements of the dual-stream video decoder circuit 10 previously described with regard to FIG. 1, are indicated using the same reference numerals and will not be described again in detail.

As illustrated in FIG. 2, the P-I-P decoder module 216 comprises a dual MPEG-2 video decoder 220, a preparser 15, and a bus 224. In the embodiment illustrated in FIG. 2, the P-I-P controller 222 is located externally to the P-I-P decoder module 216. In such an embodiment, the primary and secondary decoded video data streams generated by the dual MPEG-2 video decoder 220, which operates in a manner similar to that of the decoder 20, are supplied directly to the P-I-P controller 222 which is implemented separately form the P-I-P decoder module 216.

The P-I-P controller 224 combines the primary and secondary decoded video data streams during P-I-P modes of operation to generate the decoded video output signal. However, during normal modes of operation the P-I-P controller 222 merely outputs the primary decoded video data stream as the decoded video output signal.

The operation and advantages of the decoders 10, 210 of the present invention will now be described with reference to the embodiments illustrated in FIGS. 1 and 2.

U.S. patent application Ser. No. 08/339,436, describes various ways to implement a low resolution video decoder which may be used for decoding an MPEG-2 compliant bitstream into lower resolution representations of the pictures included in an original bitstream. The same or similar techniques can be used to create pictures suitable for picture-in-picture applications from, e.g., a standard or high definition video bitstream.

The secondary video decoder 19, 219 of the P-I-P dual MPEG-2 video decoder module 20, 220, respectively, is implemented in accordance with the present invention as a low resolution video decoder. In addition, a pre-parser 15 which is the same as, or similar to, that described in the cited patent application may be used in front of the reduced resolution video decoder 19, 219 to reduce the buffer memory requirements associated with the reduced resolution video decoder 19, 219.

Because the reduced resolution video decoder 19, 219 of the dual MPEG-2 video decoder 20, 220 operates on a downsampled or otherwise reduced resolution picture, the decoder 19, 219 requires only a fraction of the memory for anchor frame storage that the full resolution decoder 17, 217 of the dual MPEG-2 video decoder 20, 220 requires.

It is expected that a standard definition MPEG-2 decoder that decodes standard definition pictures will require about 1.6 Mbytes of memory to implement both the required decoder buffer and frame memory. Given the packaging units of presently available memory devices, it is expected that a standard definition MPEG-2 decoder will incorporate 2 Mbytes of video memory. This leaves about 400 Kbytes of excess video memory available for other uses.

A reduced resolution video decoder which operates on a standard definition picture down sampled in each dimension by 2 would require about 350 Kbytes to store an anchor frame. Thus, if the 400 Kbytes of excess video memory were used as a frame memory to store such reduced resolution pictures, there would still be an additional 50 Kbytes of memory, e.g., approx. ¼ the amount of memory used in a standard decoder buffer, available to implement a decoder buffer for the reduced resolution video decoder 19, 219.

Similarly, a reduced resolution video decoder which operates on a standard definition picture down sampled in each dimension by 3 would require only about 150 Kbytes to store an anchor frame. Thus, if the 400 Kbytes of excess video memory were used as a frame memory to store such reduced resolution frames, there would be an additional 250 Kbytes of memory for use as a decoder buffer. This amount of memory exceeds the amount of memory generally used to implement a standard definition video decoder buffer.

Since various downsampling ratios can be used in accordance with the present invention, it is possible to select a down-sampling ratio optimizes memory usage.

While it is possible to implement the reduced resolution video decoders 19, 219 independently from the full, e.g., standard definition, MPEG-2 video decoders 17, 217, to most effectively use the extra memory and to reduce implementation costs, the reduced resolution decoders 19, 219, should be integrated on a single device, e.g., integrated circuit, with the corresponding full resolution decoder 17, 217. Such an implementation is illustrated in the embodiments of FIGS. 1 and 2. In accordance with the present invention memory access and usage is facilitated by using a single video memory module 18 and a common bus 24, 224 to access the memory module 18, which is shared between the two decoders (17, 19), (217, 219).

A system which uses the described dual decoder architecture can be implemented using two separate T/D/TD circuits 12, 14 as illustrated in FIGS. 1 and 2 or alternatively, the reduced resolution decoder 19, 219 might be supplied only with access to video programs within a single multiplex of multiple programs which includes that program which is supplied to the full resolution video decoder 17, 217. This alternative approach would use two outputs from a T/D/TD circuit. Either of these architectures would allow almost instantaneous switching between the reduced resolution and the full resolution program as is possible with current analog picture-in-picture television sets.

The output of the P-I-P decoder module of the present invention, which includes the dual MPEG-2 video decoder, can be two separate video signals which are mixed to form the picture-in-picture function by a display processor such as the P-I-P controller 222 illustrated in the FIG. 2 embodiment. Alternatively, the switching of the pixel, i.e., decoded data stream, between a P-I-P format and a standard format, can be done on the P-I-P decoder module 16 by the P-I-P controller 22 as illustrated in FIG. 1 so that during P-I-P mode operation, the video signal output by the P-I-P decoder module 16 already includes imbedded picture-in-picture data.

While the P-I-P decoder of the present invention is described as a dual bitstream decoder, the methods of the present invention used to implement the decoder can be used to implement a decoder capable of decoding any number of bitstreams. In addition, while the exemplary embodiments are described as MPEG-2 decoders, it is to be understood that the present invention can be used to implement decoders capable of decoding non-MPEG digital signals as well.

What is claimed is:

1. A picture-in-picture circuit for generating full resolution images from first encoded video data and reduced resolution images from second encoded video data, comprising:

first decoder means for decoding the first encoded video data to generate first decoded video data;

second decoder means for decoding at least a portion of the second encoded video data to generate second decoded video data;

video memory module means coupled to the first and second decoder means for storing the first encoded video data, the first decoded video data, at least the portion of the second encoded video data and the second decoded video data, the video memory module means including:

i. a first segment of memory for storing the first encoded video data and the first decoded video data; and ii. a second segment of memory for storing at least the portion of the second encoded video data and the second decoded video data, the second segment of memory being smaller than the first segment of memory; and picture-in picture control module means coupled to the first and second decoding means for selectively combining the first and second decoded video data to form a single video signal.

2. The picture-in-picture video circuit of claim 1, further comprising:

a second tuner for supplying the second encoded video data;

data reduction means coupled to the video memory module for performing a data reduction operation on the second encoded video data to generate the portion of the second encoded video data stored in the second segment of the video memory module means;

bi-directional bus means for communicating encoded and unencoded video data coupled to the first and second decoder means and the memory module means, and wherein the first decoder means receives the first encoded video data from the video memory module and stores the first decoded video data in the video memory module means via the bi-directional bus means, and wherein the second decoder means receives the portion of the second encoded video data stored in the video memory module means and stores the second decoded video data in the video memory module means via the bi-directional bus means.

3. The picture-in-picture circuit of claim 2, wherein the data reduction means and the picture-in picture control module means are also coupled to the video memory module means by the bi-directional bus means.

4. An apparatus for decoding encoded digital video data, comprising:

a first digital video decoder for generating a first set of decoded digital video data by decoding a first set of encoded digital video data;

a second digital video decoder for generating a second set of decoded digital video data by decoding a second set of encoded digital video data;

a video memory module for use as both a decoder buffer and a frame memory by said first and second digital video decoders, the video memory module including:

i. a first segment of memory for storing the first set of encoded digital video data and the first set of decoded video data; and ii. a second segment of memory for storing the second set of encoded digital video data and the second set of decoded digital video data; and a bus for coupling the first and second video decoders to the video memory module, the first decoder being supplied with the first set of encoded digital video data stored in the first segment of memory and storing the first set of decoded digital video data in the first memory via the bus, the second decoder being supplied with the second set of encoded digital video data stored in the second segment of memory and storing the second set of decoded digital video data in the second segment of memory via the bus.

5. The apparatus of claim 4, further comprising:

a data reduction means coupled to the video memory module, the data reduction means receiving a third set of encoded digital video data and performing a data reduction operation thereon to generate the second set of encoded digital video data stored in the second segment of memory; and wherein the first digital video decoder is a full resolution digital video decoder;

wherein the second digital video decoder is a reduced resolution digital video decoder; and wherein the first segment of memory is larger than the second segment of memory.

6. The apparatus of claim 5, further comprising:

a picture-in-picture module coupled to the picture memory via the bus, the picture-in-picture module receiving the first and second sets of decoded digital video data via the bus and combining the first and second sets of decoded digital video data to generate a single video signal representing a second image displayed within a first image.

7. The apparatus of claim 6, wherein the first and second digital video decoders are MPEG-2 video decoders; and wherein the first and second sets of encoded digital video data are set of MPEG-2 compliant encoded digital video data.

8. The apparatus of claim 7, wherein the first and second digital video decoders are implemented on a single integrated circuit.

9. The apparatus of claim 5, further comprising:

a picture-in-picture module directly coupled to the first and second digital video decoders for receiving therefrom the first and second sets of decoded digital video data and for combining the first and second sets of decoded digital video data into a single video signal.

10. The apparatus of claim 9, wherein the first and second digital video decoders are MPEG-2 video decoders; and wherein the first and second sets of encoded digital video data are sets of MPEG-2 compliant encoded digital video data.

11. The apparatus of claim 10, wherein the first and second digital video decoders are implemented on a single integrated circuit.

12. The apparatus of claim 4, wherein the first digital video decoder is a standard definition video decoder;

the second digital video decoder is a reduced resolution video decoder;

wherein the memory module consists of 2 million bytes memory implemented using 1 million byte integrated memory circuits; and wherein:

i. a first memory segment including more than 1 million bytes of the 2 million bytes of memory is for use by the first digital video decoder; and ii. a second memory segment including less than 1 million bytes of the 2 million bytes of memory is for use by the second digital video decoder.

13. An apparatus for decoding encoded digital video data, comprising:

a first digital video decoder for generating a first set of decoded digital video data by decoding a first set of encoded digital video data;

a second digital video decoder for generating a second set of decoded digital video data by decoding a second set of encoded digital video data;

a video memory module including n memory units, each memory unit including random access memory packaged in an m bit package for a total of nm bits of memory, wherein n and m are positive integers, the video memory module being for use as both a coded data buffer and a frame memory by said first and second digital video decoders, the video memory module including:

i. a first segment of memory including p bits of the nm bits of memory, where p is a positive integer greater than m, the first segment of memory being used to store the first set of encoded digital video data and the first set of decoded video data; and ii. a second segment of memory consisting of nm-p or fewer bits of the nm bits of memory, where nm-p is less than m, the second segment of memory being used to store the second set of encoded digital video data and the second set of decoded digital video data; and a bus for coupling the first and second video decoders to the video memory module, the first decoder being supplied with the first set of encoded digital video data stored in the first segment of memory and storing the first set of decoded digital video data in the first memory via the bus, the second decoder being supplied with the second set of encoded video data stored in the second segment of memory and storing the second set of decoded digital video data in the second segment of memory via the bus.

14. The apparatus of claim 13, further comprising:

a picture-in-picture control module coupled to the first and second digital video decoders for selectively combining the first and second sets of decoded digital video data into a single video signal.

15. The apparatus of claim 14, wherein each of the n memory units is a 1 mega-byte memory unit.

16. The apparatus of claim 14, wherein each of the n memory units is a 4 mega-byte memory unit.

17. The apparatus of claim 14, wherein each of the n memory units is an 16 mega-byte memory unit.

18. A method of generating decoded video data, comprising the steps of:

providing a memory module including n memory units, each memory unit including random access memory packaged in an m bit package for a total of nm bits of memory, wherein n and m are positive integers, the memory module being for use as both a coded data buffer and a frame memory by a plurality of video decoders, the video memory module including:

i. a first segment of memory including p bits of the nm bits of memory, where p is a positive integer greater than m; and ii. a second segment of memory consisting of nm-p or fewer bits of the nm bits of memory, where nm equals n times m;

receiving encoded digital video data representing a first image;

storing the received encoded digital video data representing the first image in the first segment of memory;

receiving encoded digital video data representing a second image;

storing the received encoded digital video data representing the second image in the second segment of memory;

decoding the encoded digital video data representing the first image, the step of decoding the encoded digital video data representing the first image including the step of storing decoded digital video data in the first segment of memory;

decoding the encoded digital video data representing the second image, the step of decoding the encoded digital video data representing the second image including the step of storing decoded digital video data in the second segment of memory.

19. The method of claim 18, wherein the second decoder downsamples the digital video data representing the second image to limit the amount of decoded video data to an amount which can be stored in the second segment of memory.

20. The method of claim 19, further comprising the step of:

combining the decoded digital video data representing the first and second images into video data representing a single image comprising the second image contained within the first image.

* * * * *